Oct. 27, 1970          P. BOTZ          3,535,865
APPARATUS FOR HELICALLY WINDING A RIB ON A TUBE
Filed July 22, 1968          3 Sheets-Sheet 1
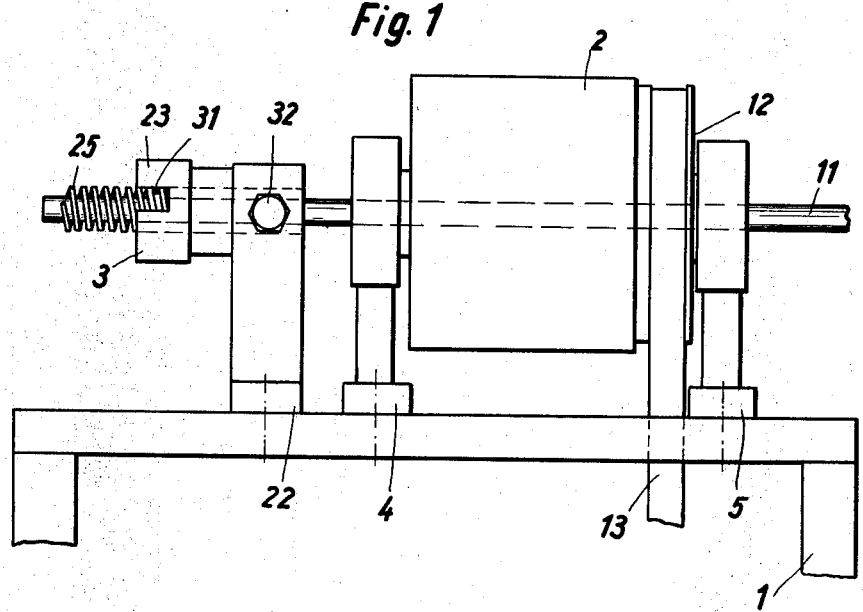
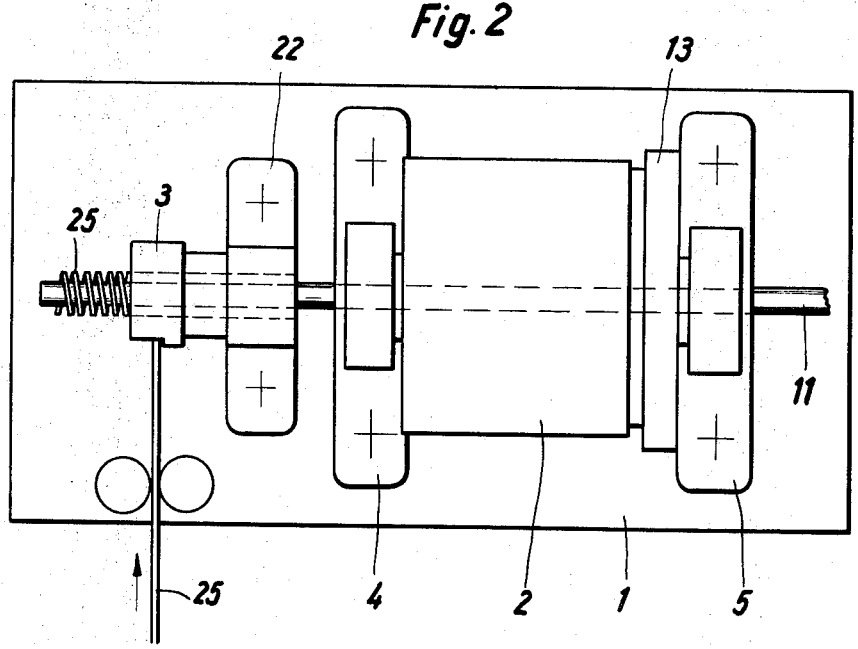
Inventor:
Paul Botz,
By Marmorek & Bierman,
His Attorneys.

Oct. 27, 1970   P. BOTZ   3,535,865
APPARATUS FOR HELICALLY WINDING A RIB ON A TUBE
Filed July 22, 1968   3 Sheets-Sheet 2

Inventor:
Paul Botz,
By Marmorek & Bierman,
His Attorneys.

United States Patent Office 3,535,865
Patented Oct. 27, 1970

3,535,865
APPARATUS FOR HELICALLY WINDING A RIB ON A TUBE
Paul Botz, Heidelberg-Kirchheim, Germany, assignor to Mecano-Bundy GmbH., Heidelberg-Pfaffengrund, Germany, a corporation of Germany
Filed July 22, 1968, Ser. No. 746,628
Claims priority, application Germany, July 21, 1967, 1,602,312
Int. Cl. B65h 81/08
U.S. Cl. 57—11                                          8 Claims

ABSTRACT OF THE DISCLOSURE

An apparatus for helically winding a ribbon on a tube to form a continuous rib thereon has drive means for rotating the tube and permitting axial advance of the tube. This is effected by a plurality of rollers individually rotatably supported by brackets rockably mounted in a rotating casing to rock in a plane including the rotation axes of the rollers which axes are perpendicular to the longitudinal axis of the tube. The rollers are arranged around the tube in planes radially of the tube and have conical circumferential surfaces in engagement with the tube. Springs associated with the brackets and the casing urge the brackets to rock in a direction whereby surfaces of the rollers are pressed against the tube.

---

The present invention relates to an apparatus for helically winding a ribbon on a tube to form a continuous rib thereon.

Devices are known, for helically wrapping ribbon material around tubes, which consist of a stationary ribbon guide and an apparatus for rotating and advancing the tube. The apparatus for rotating and advancing the tube comprises two rollers engaging the tube with adjustable inclinations at two diametrically opposite locations, the rollers being driven by a common motor and their distance from the tube axis being changeable. The rotating drive rollers rotate the tube to be wrapped, whereby the inclination of the rollers defines the amount by which the tube advances in axial direction at each revolution. This conventional arrangement has the disadvantage that it can operate at low speeds only. At higher rotational speeds of the tube to be wrapped, the advance feed per revolution of the tube cannot be maintained constant, and hence satisfactory rotation of the tube is not assured. The described conventional arrangement can be used only for tubes of an external diameter of at least 10 mm.

An apparatus is known for applying a flat ribbon as a helical rib or fin to heating or cooling tubes whereby rotation and advance of the tube is effected by rollers acting on two diametrically opposite points of the tube, the circumferential surfaces of the rollers having a recess of semicircular cross section corresponding to the diameter of the tube. The rollers are pressed by spring force against the surface of the tube and are supported by a rotary head piece. The rotation of the latter is transmitted to the rollers through a conventional sun gear and two worm gears cooperating therewith, in such manner that at one revolution of the head piece the rollers rotate through a certain angle corresponding to the advance of the tube at each revolution. At increasing rotational speed of the head piece, however, the centrifugal force of the rollers increases so that the pressure exerted by the rollers on the tube is insufficient for rotating the tube, and hence this conventional apparatus can also be operated at relatively low speed only. Furthermore, this apparatus cannot be used for tubes the external diameter of which is smaller than 10 mm.

It is accordingly among the principal objects of the invention to provide an apparatus for helically winding a ribbon onto a tube to form a continuous rib or fin thereon which apparatus is extremely simple and assures faultless rotation and constant advance of the tube also at high-speed operation and which can be used also for tubes the outside diameter of which is less than 10 mm.

The apparatus according to the invention comprises drive means effecting rotation of the tube at simultaneous free axial movability of the tube, and a winding head that defines the pitch of the helically wound ribbon and effecting axial movement of the tube. The drive means comprises at least two rollers placed in a rotary casing and equally distributed around the rotation axis of the casing which rollers are constructed and are rotatably borne in rockable brackets to rotate around axes perpendicular to the aforesaid rotation axis so that the circumferential surfaces of the rollers act wedge-like on the surface of the tube when the casing is rotated. The circumferential surfaces of the rollers are preferably conical and are pressed onto the surface of the tube by means of springs acting on the rockable brackets.

In order to make sure that the pressure of the rollers on the tube is sufficient also at high operating speeds, the rockable brackets are provided with eccentric weights which rock the brackets in a direction increasing the pressure exerted by the rollers on the tube.

The winding head is stationary and is provided with a feed slot for the ribbon and has a bore for receiving the tube and is provided with a screw passage that has the pitch of the helix formed by the wound ribbon and a cross section corresponding to that of the ribbon. The angular extension of the screw passage is approximately 360°. This assures a correct and always constant movement of the tube.

The aforesaid screw passage is formed by a plurality of pins extending radially of the axis of the bore of the winding head. If required, the winding head may be provided with a guide sleeve that has a helically shaped end face opposite said pins and a pitch that corresponds to that of the passage wall formed by the pins. This end face is spaced from said pins to permit movement of the ribbon to be wound between the end face and the wall formed by the pins. Since a winding head can be used only for a certain rib pitch and cross section, the winding head is arranged exchangeably so that a winding head of different dimensions can be used for winding different ribbons on different tubes.

The novel features which are considered characteristic of the invention are set forth with particularity in the appended claims. The invention itself, however, and additional objects and advantages thereof will best be understood from the following description of an embodiment thereof when read in connection with the accompanying drawings, wherein:

FIG. 1 is a schematic side elevational view of an apparatus according to the invention;

FIG. 2 is a schematic plan view of the apparatus shown in FIG. 1;

Figure 3:
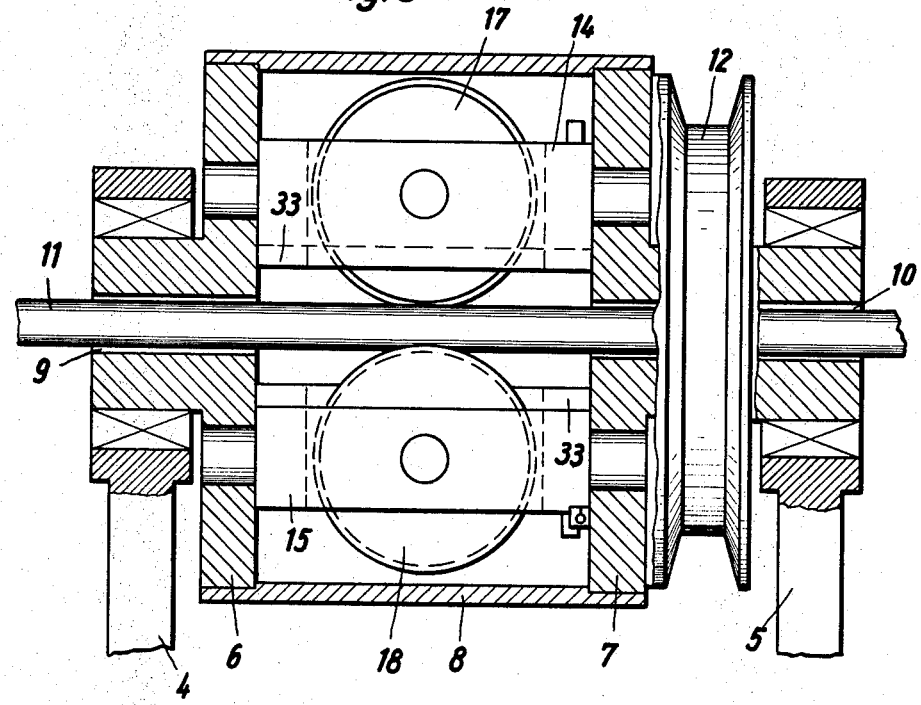
FIG. 3 is a schematic longitudinal sectional view of drive means according to the invention, with the lower roller displaced at an angle of 60°.

Referring more particularly to FIGS. 1 to 4 of the drawing, a frame 1, which is shown partly only, supports a rotary drive 2 and a winding head 3. The drive 2 comprises two bearing blocks 4 and 5 rotatably supporting disc shaped side plates 6 and 7 which are connected in axially spaced relation by a casing 8. Each side plate 6, 7 has a central aperture 9, 10, respectively, for receiving a tube 11 around which a rib must be helically wound. In the illustrated embodiment of the invention a V-belt pulley 12 forms a part of the side plate 7 which is rotated by means of a V-belt 13 by a motor, not shown, supported by the frame 1.

In the illustrated embodiment three similarly built brackets 14, 15 and 16 are rockably supported by and between the side plates 6 and 7, the rocking axes being parallel with the rotation axis of the drive means 2.

The brackets 14, 15 and 16 are equally spaced from the rotation axis of the drive 2 and are angularly displaced for 120°. Each bracket 14, 15, 16 has a hole of rectangular cross section for individually receiving a roller 17, 18 and 19. These equally constructed rollers are individually rotatably supported in the brackets 14, 15 and 16 and have conical circumferential surfaces. The distance between the rocking axes of the brackets and the axis of the drive 2 is such that the rollers 17, 18, 19 abut against the tube 11 at substantially the middle of the width of the circumferential surface of the rollers. For working tubes of greater or smaller diameter rollers of correspondingly different diameters are used.

Figure 4:
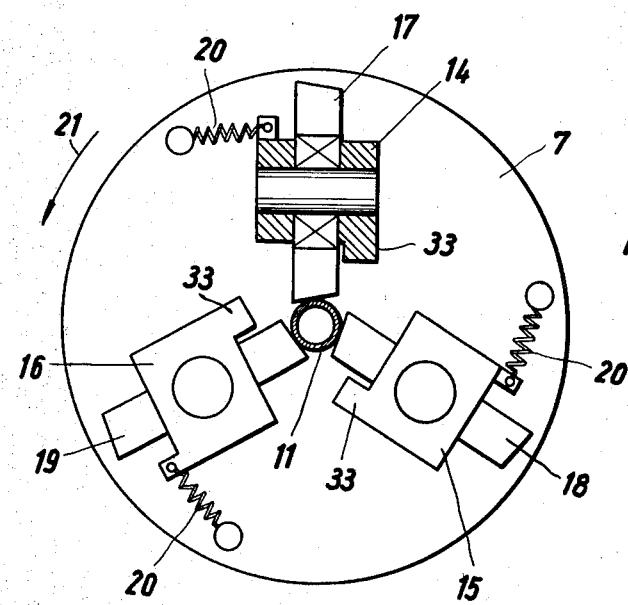
FIG. 4 is a part sectional axial view of the inside of the drive means shown in FIG. 3.
Figure 5:
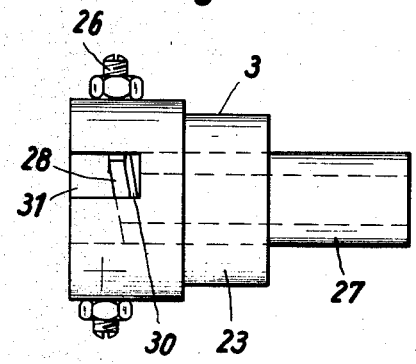
FIG. 5 is a side elevational view of a winding head according to the invention.
Figure 6:
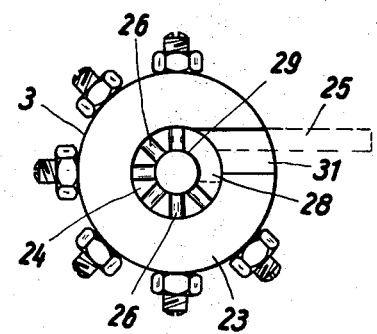
FIG. 6 is an elevational end view of the winding head shown in FIG. 5.
Figure 7:
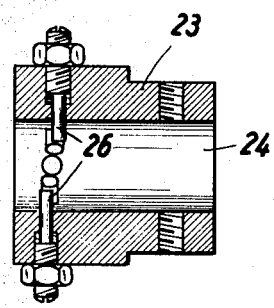
FIG. 7 is a longitudinal sectional view of a ring forming part of the winding head shown in FIGS. 5 and 6.
Figure 8:
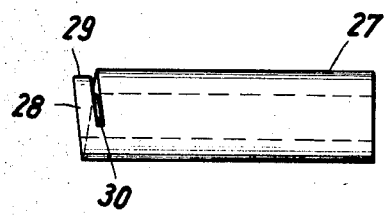
FIG. 8 is a side elevational view of a guide sleeve forming part of the winding head shown in FIGS. 5 and 6.
Figure 9:
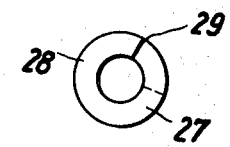
FIG. 9 is an end elevational view of the guide sleeve shown in FIG. 8.

Each bracket 14, 15, 16 is acted on by a spring 20 which is made fast on the side plate 7 and tends to rock the respective bracket with its roller in the direction of the rotation of the drive 2 indicated by arrow 21 in FIG. 4. The springs 20 effect pressing of the circumferential surfaces of the rollers 17, 18 and 19 against the surface of the tube 11. There is friction between the rollers 17, 18 and 19 and the tube 11 when the drive 2 is in operation. The friction force acts tangentially on the tube 11 and effects a little rocking of the brackets 14, 15 and 16 in the same sense as is caused by the springs 20. The pressure exerted by the rollers 17, 18 and 19 on the tube 11 is increased due to the conical configuration of the circumferential surface of the rollers. Although the tube 11 is held by the rollers 17, 18 and 19 for rotation in the direction of the arrow 21, the tube 11 can be moved in axial direction substantially without the application of force because of the support of the rollers 17, 18 and 19 in the rockable brackets 14, 15 and 16.

The winding head 3 is supported in line with the drive 2 by a bearing block 22. As seen in FIGS. 5 to 9, the winding head 3 consists essentially of a ring 23 having a central bore 24. The diameter of the latter corresponds to the outside diameter of the tube 11 with a helically wound rib or fin 25. In the illustrated embodiment of the invention six radially positioned adjustable and replaceable steel pins 26 extend into the bore 24, the pins being arranged on a circumferential helical line the pitch of which corresponds to the pitch of a helix along which the ribs or fins of the tube to be wound are located. The pins 26 extend into the bore 24 by a length corresponding to the height or the diameter of the rib 25 to be wound.

A guide sleeve 27 is made fast in the bore 24 of the ring 23 by conventional clamping means, not shown. The outside diameter of the guide sleeve 27 corresponds to the diameter of the bore 24 whereas the inside diameter of the sleeve 27 is somewhat greater than the diameter of the tube 11. The end face 28 of the sleeve 27 which is in the bore 24 of the ring 23, has a configuration corresponding to the pitch of the rib helix and has a guide slot 30 in the steplike transition area 29, the width of the slot 30 corresponding to the width of the rib 25 to be wound. The helically shaped front face 28 of the guide sleeve has an angular extension of more than 360°.

The sleeve 27 is inserted so far into the ring 23 that the transition area or step 29 is adjacent the subsequent steel pin 26 so that the steel pins in connection with the front face of the sleeve 27 form a screw path or passage corresponding to the cross section of the rib, the pitch of the screw passage corresponding to that of the wound rib and the angular extension of the screw passage being about 360°. This screw passage may be formed in a different manner, for example, by working it into the bore 24 of the ring 23. The ring 23 of the winding head 3 is provided in the neighborhood of the guide slot 30 of the inserted guide sleeve 27 with a slot 31 for admitting the ribbon to be wound. The aforedescribed winding head is held by the guide sleeve 27 and a setscrew 32 on the bearing block 22.

When starting the winding operation, the tube 11 is pushed into the drive 2, which does not yet rotate, for example, by hand from the side distal from the winding head whereafter the tube is gripped by the rollers 17, 18 and 19. In order to avoid that these rollers are too far rocked by the springs 20 when no tube is in the drive 2, a suitable abutment (not shown) may be associated with the brackets 14, 15 and 16. A radially extending slot corresponding to the cross section of the rib band to be wrapped around the tube is provided at the forward end of the tube to be wrapped. The tube 11 is pushed so far into the winding head that the slot in the forward end of the tube 11 is close to the guide slot 30.

After insertion of a steel ribbon 25 having a rectangular cross section into the slot of the tube 11 the drive 2 with which, for example, an infinitely variable speed transmission may be associated, is started and the tube 11 is rotated. When the tube 11 is rotated, the ribbon 25 inserted in the slot of the tube 11 is wound onto the tube 11 according to the pitch of the screw passage formed in the winding head 3. The axial movement of the tube 11 is effected by the winding ribbon 25 and the screw passage formed in the winding head 3. The latter can be used only for tubes of a certain outside diameter, for a ribbon of a certain cross section, and for a certain winding pitch. For tubes of different outside diameter, a ribbon of different cross section, and for a different winding pitch a different winding head 3 must be placed in the bearing block 22.

In order to avoid insufficient pressure of the rollers 17, 18 and 19 on the tube 11 at high rotational speed of the drive 2, each bracket 14, 15 and 16 is provided with an eccentric weight 33 which effects increasing the pressure exerted by the rollers 17 to 19 on the tube 11 at increasing speed of rotation of the drive 2.

As a modification the drive 2 may be provided with additional sets of three rollers each, whereby each roller is borne in its own bracket. In this way the contact pressure of the individual rollers can be reduced. This arrangement of the rotary drive is of particular advantage for working with tubes having a thin wall.

What is claimed is:

1. An apparatus for helically winding a ribbon on a tube to form a continuous rib thereon, comprising drive means engaging the tube and so constructed and arranged as to rotate the tube about an axis and to permit simultaneously free axial movement of the tube, and a winding head receiving the tube from said drive means and comprising means for guiding at a screw pitch the ribbon on a helical path onto the rotating tube thereby advancing the tube.

2. An apparatus as defined in claim 1, said drive means comprising a rotatably supported casing, means for rotating said casing about an axis of rotation, a plurality of brackets rockably supported in said casing for individually rocking on axes parallel to said axis of rotation of said casing, a roller rotatably borne in each of said brackets for rotation about an axis perpendicular to said rotation axis of said casing, apertures defined in said casing concentric with the rotation axis of said casing and affording longitudinal passage of the tube through said casing concentric with said rotation axis of said casing, said rollers individually having conical circumferential surfaces in frictional engagement with the tube for rotating the latter when said casing is rotated.

3. An apparatus according to claim 2 comprising springs disposed between said casing and said brackets for urging said brackets to rock in the direction where said surfaces of said rollers are pressed against the tube.

4. An apparatus according to claim 3 wherein each bracket comprises an eccentric weight for increasing the pressure of said rollers against the tube when said casing rotates at relatively high speed.

5. An apparatus as defined in claim 1 comprising a stationary bearing block, said winding head being made fast on said bearing block, a bore defined in said winding head for receiving the tube coming from said drive means, means placed in said bore forming a helical path having a passage area corresponding to the cross section of the ribbon to be mound on the tube and affording passage of the ribbon to be wound on the tube and affording passage path corresponding to the pitch of the helically wound ribbon, the angular extent of said path being substantially 360°.

6. An apparatus according to claim 5 wherein said winding head is removably connected to said bearing block for affording selective use of winding heads suitable for different tube diameters and rib sizes.

7. An apparatus according to claim 5 comprising a plurality of pins placed radially of the longitudinal axis of said bore and forming a wall of said path.

8. An apparatus according to claim 7 comprising a guide sleeve having an end face opposite said wall formed by said pins and spaced therefrom, the spacing between said end face and said wall being substantially equal to the thickness of the ribbon.

References Cited
UNITED STATES PATENTS

| | | | |
|---|---|---|---|
| 391,908 | 10/1888 | Murphy | 57—11 |
| 601,834 | 4/1898 | Huestis | 57—11 XR |
| 840,715 | 1/1907 | Schmidt | 57—11 |
| 2,328,792 | 9/1943 | Eisenbeis | 57—11 |
| 2,461,231 | 2/1949 | Oppenheim | 57—11 XR |
| 2,967,390 | 1/1961 | McCormick | 57—11 |
| 3,037,343 | 6/1962 | Haas et al. | 57—11 XR |
| 3,187,494 | 6/1965 | Fuller | 57—11 XR |

JOHN PETRAKES, Primary Examiner